United States Patent [19]
Tsuge et al.

[11] Patent Number: 5,880,421
[45] Date of Patent: Mar. 9, 1999

[54] POWER WINDOW SIDE VISOR SENSING SWITCH ARRANGEMENT

[75] Inventors: Noboru Tsuge, Kariya; Takeshi Tanaka; Tomoyuki Kikuta, both of Toyohashi; Hidenori Ishihara, Hamamatsu, all of Japan

[73] Assignee: ASMO Co., Ltd., Kosai, Japan

[21] Appl. No.: 826,129

[22] Filed: Mar. 27, 1997

[30] Foreign Application Priority Data

Apr. 23, 1996 [JP] Japan .................................. 8-101639
Jan. 16, 1997 [JP] Japan .................................. 9-005817
Feb. 3, 1997 [JP] Japan .................................. 9-020715

[51] Int. Cl.⁶ .............................. H01H 3/16; E05F 15/00
[52] U.S. Cl. ...................... 200/61.44; 49/28; 200/61.43
[58] Field of Search ............................ 200/61.41, 61.43, 200/61.44, 61.71; 49/26, 27, 28

[56] References Cited

U.S. PATENT DOCUMENTS

| 3,465,476 | 9/1969 | Rayner et al. ............... 200/61.71 X |
| 3,693,150 | 9/1972 | Daniels ........................ 200/61.44 |
| 3,710,050 | 1/1973 | Richards ...................... 200/61.43 |
| 3,793,772 | 2/1974 | Kouth ................................. 49/28 |
| 3,830,018 | 8/1974 | Arai et al. ................. 200/61.43 X |
| 4,943,757 | 7/1990 | Richter et al. .................. 49/28 X |
| 5,192,837 | 3/1993 | Chardon ....................... 200/61.41 |
| 5,296,658 | 3/1994 | Kramer et al. .............. 200/61.43 |
| 5,459,962 | 10/1995 | Bonne et al. ................ 200/61.43 |
| 5,592,060 | 1/1997 | Racine et al. ............. 200/61.43 X |
| 5,712,620 | 1/1998 | Greenwood ............... 200/61.41 X |
| 5,754,017 | 5/1998 | Tsuge et al. .................... 318/434 |
| 5,801,347 | 9/1998 | Tsuge et al. ................. 200/61.44 |

FOREIGN PATENT DOCUMENTS

| 0 381 578 A | 8/1990 | European Pat. Off. . |
| 91 11 806 U | 9/1991 | Germany . |
| 64-53389 | 4/1989 | Japan ................ E05F 15/10 |
| 6-260054 | 9/1994 | Japan ................ H01H 13/52 |
| 7-4137 | 1/1995 | Japan ................ E05F 15/10 |

Primary Examiner—J. R. Scott
Attorney, Agent, or Firm—Burns, Doane, Swecker & Mathis, LLP

[57] ABSTRACT

To provide a power window apparatus which can reliably actuate an anti-pinching mechanism even in a window provided with a side visor, a cord switch operable in response to a specific external force is mounted in a joining part of a side visor between a window frame and the side visor. The cord switch senses the external force acting on the side visor, reliably detecting a foreign object pinched between a window glass and the side visor.

16 Claims, 17 Drawing Sheets

POWER WINDOW SIDE VISOR SENSING SWITCH ARRANGEMENT

BACKGROUND OF THE INVENTION

1. Field of the Invention

The present invention relates to a side visor and a power window apparatus for vehicles using the same for an anti-pinching mechanism.

2. Description of Related Art

A power window apparatus having an anti-pinching mechanism, disclosed in Japanese Utility Model Laid-Open No. Sho 64-53389 for instance, is provided with a sensing member, such as a pressure-sensitive tube sensor for sensing an external force, along the inside periphery of a window frame. This sensing member senses an external force applied when a foreign object is caught between a window glass and the window frame, to thereby stop a driving motor for moving the window glass up and down.

A conventional sensing member as disclosed in Japanese Patent Laid-Open No. Hei 6-260054 for instance, has a predetermined space with band-like electrodes of conducting rubber formed face to face and with elastic members of insulating rubber arranged on both ends in the direction of width intersecting at right angles the longitudinal direction of the band-like electrodes. A specific voltage is applied between the band-like electrodes to sense the external force with the voltage thus applied between the band-like electrodes.

In a vehicle mounted with a side visor for shading the peripheral edge of the window opening, the upward or downward movement of the window glass will not stop if a foreign object is caught between the window glass and the side visor as shown in FIG. 32. A foreign object 7 comes in contact with the top end portion 2a of a window glass 2, the edge portion 5a of a side visor 5, and a weatherstrip 8 closing a clearance between the window glass 2 and the window frame (vehicle body) 3. An external force F acting on the sensing member 4 acts on the point of action f at a contact point between the weatherstrip 8 and the foreign object 7; therefore the larger the size h of the outside dimensions of the side visor 5 in a direction in which the window glass 2 is opened and closed, the more the point of action f moves toward the vehicle interior.

Accordingly if the size h exceeds a specific value, the point of action f will be positioned out of the sensible range of the sensing member 4. In this state the sensing member 4 can not sense the external force, causing the occurrence of the above-described trouble.

Furthermore, because the edge portion 5a of the side visor 5 is positioned on the closed side of the window glass 2 off the location of the sensing member 4, the foreign object 7 will be caught between the window glass 2 and the side visor 5 before it contacts the sensing member 4 particularly when the foreign object 7 comes in from above toward the vehicle interior as shown by two-dot chain line in FIG. 32, thus resulting in the aforesaid trouble.

In a vehicle not provided with the side visor 5, on the other hand, the foreign object 7 is caught only between the window glass 2 and the window frame 3; therefore there will occur no trouble resulting from the aforesaid cause.

SUMMARY OF THE INVENTION

In view of the above-described disadvantages, it is a primary object of the present invention to provide a side visor having a pinching detection function.

It is a secondary object of the present invention to provide a power window apparatus designed to reliably operate an anti-pinching mechanism even in a window fitted with a side visor.

For attaining the primary object, according to the present invention, a sensing member for sensing the external force is provided on a side visor body. Preferably, this sensing member is disposed in the joining part of the side visor between a window frame and the side visor. As the sensing member, an insulating holding member for holding a pair of conducting members to define a space may be made of a porous elastic material such as polyurethane polyethylene.

For attaining the secondary object, according to an aspect of the present invention, a closing operation stopping member is provided. This stopping member will stop movement of a window body toward closing when an external force acting on a side visor which is sensed by the sensing member exceeds a predetermined value. The sensing member thus senses the external force acting on the side visor to thereby detect a foreign object being pinched. It is, therefore, possible to prevent such a trouble that the upward movement of the window body will not be stopped in case the foreign object is pinched between the window body and the side visor.

Preferably, the sensing member is disposed in the joining part between the side visor and the window frame. Therefore, even if the part of intersection between the sensing member and the line of action of the external force acting on the side visor is a dead zone where the external force can not be sensed, the external force can be sensed by a reaction from the vicinity of the part of intersection between the window frame and the line of action of the external force.

The sensing member may be disposed within a cover member covering the joining part from above.

The sensing member may be comprised of a holding member for holding a pair of conducting members, and a displacement member which makes a relative displacement with respect to the pair of conducting members. Furthermore, the displacement member may be provided with a displacement restricting member for restricting the displacement of the displacement member in a direction which intersects the direction of movement of the window body.

Alternatively, as the sensing member, an insulating holding member for holding a pair of conducting members to form a space may be produced of a porous elastic material. At this time, it is preferable that the porous elastic material be polyurethane or polyethylene.

According to another aspect of the present invention, movement of a window body toward closing may be stopped when an external force sensed by a sensing member exceeds a predetermined value and when a detected value of a driving load of the window body driving device detected by a load detecting member exceeds a predetermined value.

According to a further aspect of the present invention, movement of a window body toward closing may be stopped when an external force sensed by at least one of a first sensing member for sensing an external force acting on a side visor and a second sensing member for sensing an external force acting on a window frame exceeds a predetermined value and also when a detected value of the driving load of a window body driving device detected by a load detecting member exceeds a predetermined value. Preferably, the second sensing member may be inserted in a weatherstrip.

BRIEF DESCRIPTION OF THE DRAWINGS

Other objects, features and advantages of the present invention will become more apparent from the following detailed description when read with reference to the accompanying drawings, in which.

DETAILED DESCRIPTION OF PRESENTLY PREFERRED EMBODIMENT

Hereinafter preferred embodiments of the present invention will be described in more detail with reference to the accompanying drawings.

First Embodiment

Figure 1:
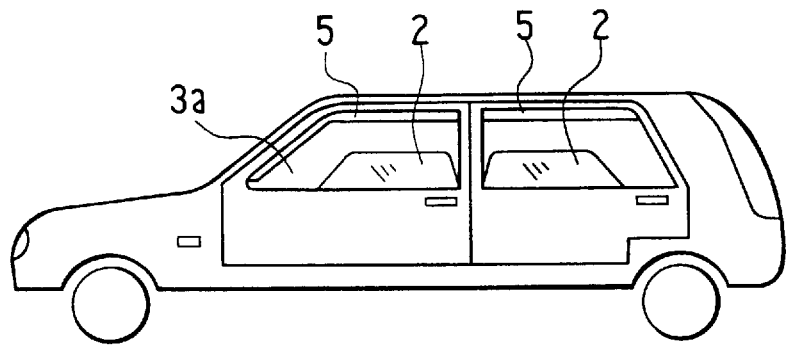
FIG. 1 is a side view of an automotive vehicle to which the present invention is applied.
Figure 2:
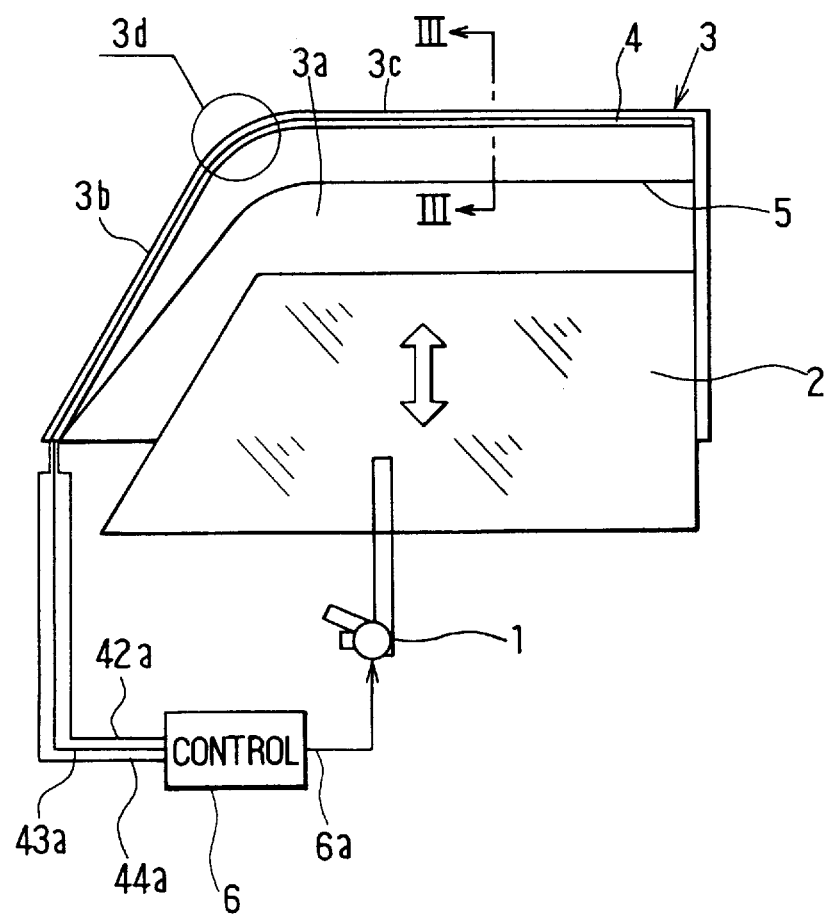
FIG. 2 is a schematic view showing a power window apparatus according to a first embodiment of the present invention.
Figure 3:
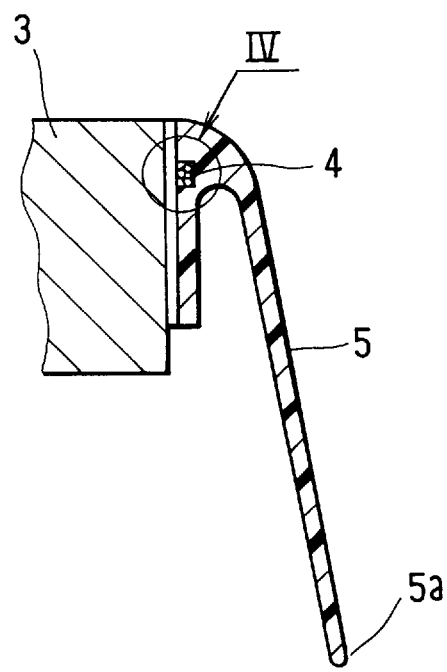
FIG. 3 is a sectional view of a cord switch used in the first embodiment and taken along line III—III in FIG. 2.

In FIGS. 1, 2 and 3, reference numeral 1 denotes a driving motor or window body driving member for driving to move up and down a window glass or window body 2 which opens and closes a window opening 3a, and reference numeral 3 denotes a window frame forming the window opening 3a. Along the exterior periphery of the window frame 3 a side visor or side visor body 5 made of resin for shading the upper periphery of the window opening 3a is mounted. At a joining part IV (FIG. 3) of the side visor 5 between the side visor 5 and the window frame 3, one cord switch or sensing member 4 for sensing the external force acting on the side visor 5 is arranged through from the front portion 3b to the upper portion 3c of the window frame 3.

Figure 4:
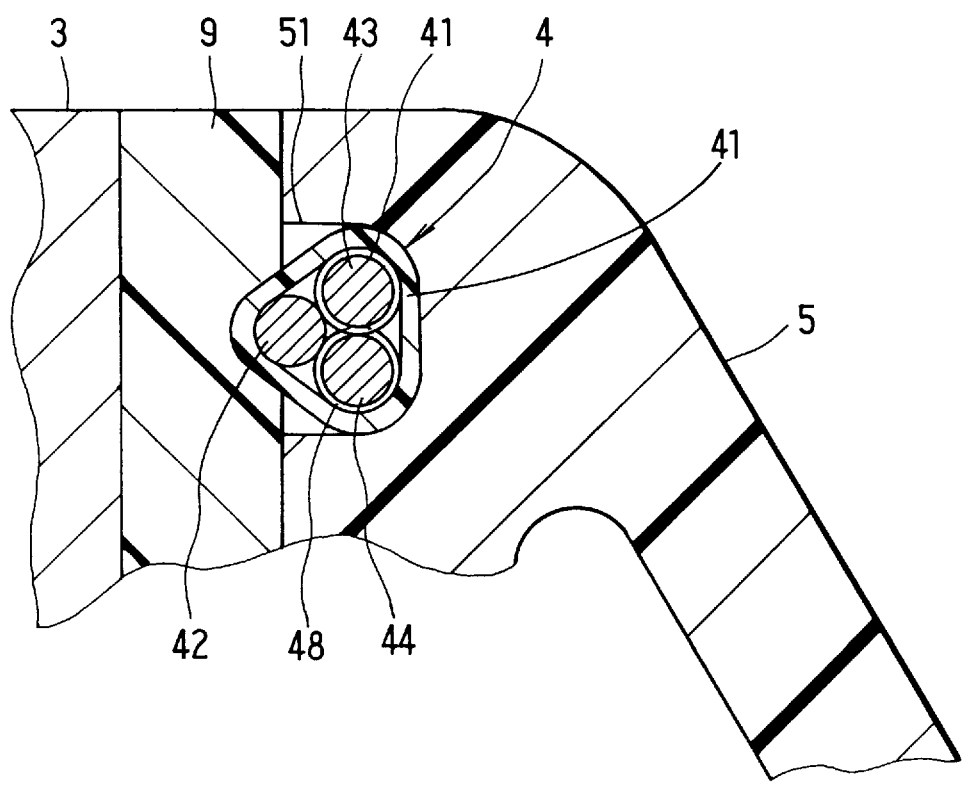
FIG. 4 is an enlarged view of a part IV in FIG. 3.

As shown in FIG. 4, between the window frame 3 and the side visor 5, an elastic member 9 made of an elastic material for absorbing irregularities of these members 3 and 5 is attached by an adhesive to these members 3 and 5. In a portion of the side visor 5 which is in contact with the elastic member 9, a recess section 51 for mounting the cord switch 4 therein is formed in a part corresponding to the front portion 3b through to the upper portion 3c of the window frame 3.

Figure 5A:
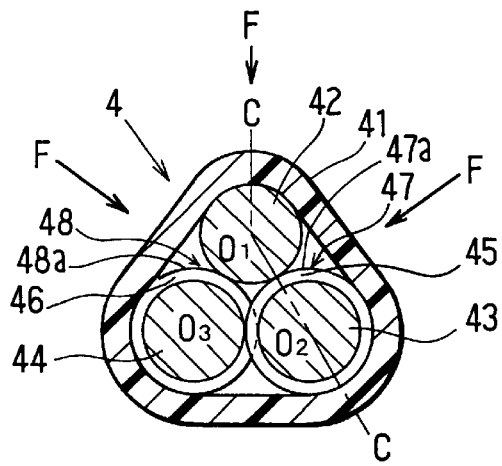
FIGS. 5A to 5C are explanatory views showing the structure of the cord switch in the first embodiment.
Figure 5B:
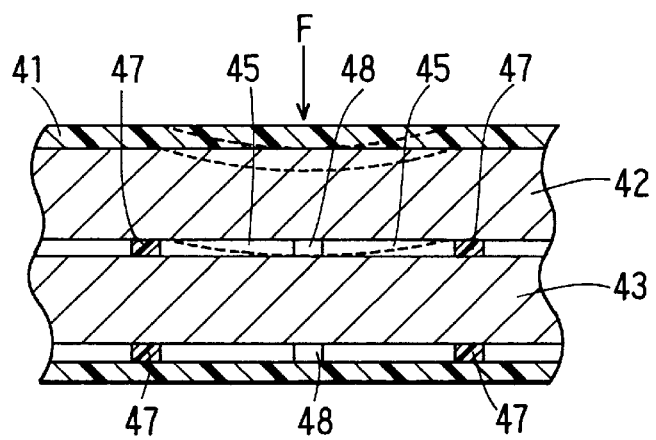
Figure 5C:
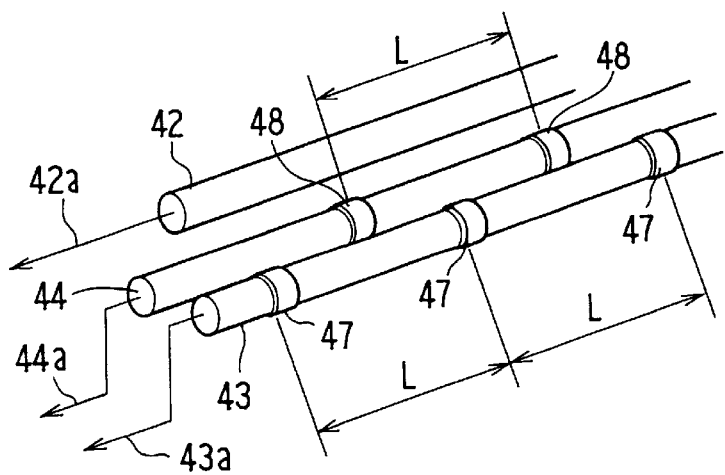

The cord switch 4 is shown in FIGS. 5A through 5C, in which in FIG. 5B shows the section along line C-01-C in FIG. 5A. Numeral 41 designates an elastically deformable covered tube made of an insulating material such as a resin. In this covered tube 41 are arranged three first to third elastically deformable conducting members 42 to 44 extending in the longitudinal direction. These conducting members 42 to 44 have nearly an equal circular sectional form. In the present embodiment, the wire diameter of the conducting members 42 to 44 is about 0.5 to 1.0 mm. These conducting members 42 to 44 are arranged in a triangular form (01-02-03) in such a manner that one conducting member will face the other two conducting members. The conducting members 42 to 44 are formed of a high fatigue-limit metal such as stainless steel, phosphor bronze, etc.

On the second and third conducting members 43 and 44 a plurality of electrically insulating members 47 and 48 forming insulating spaces 45 and 46 between the conducting members 42 to 44 are securely attached, covering a part of the circumferential side face of the conducting members 43 and 44. Furthermore, the first and second insulating members 47 and 48, as shown in FIG. 5C, have a predetermined spacing L in the longitudinal direction of the covered tube 1, and are arranged such that one insulating member will be positioned between adjacent ones of the other insulating members.

The insulating members 47 and 48 are formed of resin, and the non-adhering surfaces 47a and 48a of the insulating members 47 and 48 slidably contacts the conducting member which faces the surface. In the insulating member 47, the non-adhering surface is the surface facing the first and third conducting members 42 and 44, and in the insulating member 48 the non-adhering surface is the surface facing the first and second conducting members 42 and 43.

Electrical wirings 42a to 44a are connected to the ends in the longitudinal direction of the conducting members 42 to 44, respectively. These wirings 42a to 44a, as shown in FIG. 1, are connected to a control device 6 and a specific voltage is applied between the first conducting member 42 and the second conducting member 43 and between the first conducting member 42 and the third conducting member 44. Thus, as shown for instance in FIG. 5B, when the first conducting member 42 deflects with the external force F being acting thereon, the first conducting member 42 contacts the second conducting member 43 or the third conducting member 44, or both of the second and third conducting members 43 and 44 as indicated by a broken line. Electric current, therefore, flows between the first conducting member 42 and the second conducting member 43, or between the first conducting member 42 and the third conducting member 44. Thus the control device 6 detects that a foreign object is pinched between the window frame 3 and the window glass 2, giving a signal 6a to the driving motor 1 to stop the opening and closing operation of the window glass 2.

Figure 32:
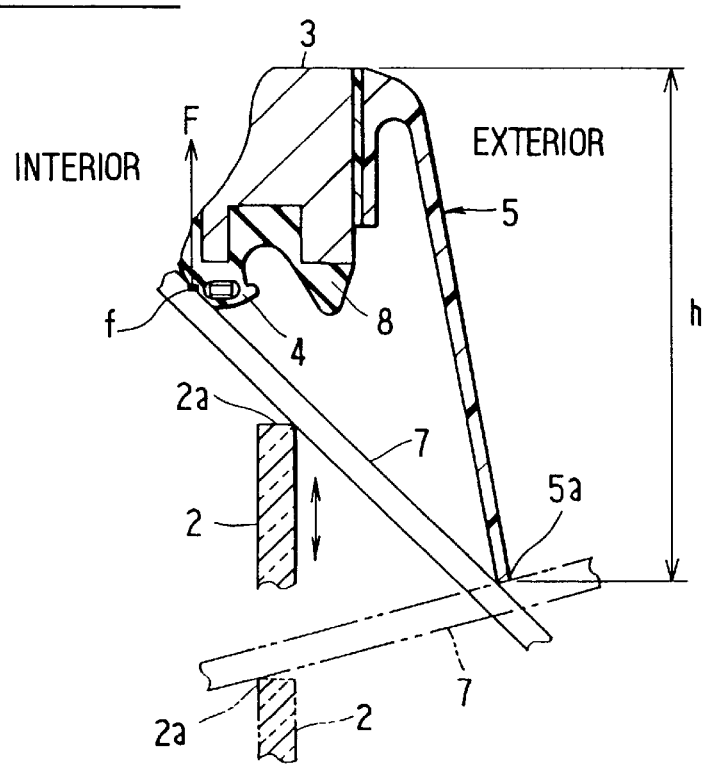
FIG. 32 is a sectional view showing a conventional power window apparatus.

In an automotive vehicle door having the side visor, a foreign object, if pinched, will contact the side visor 5 and the window glass 2. That is, in the event the foreign object is pinched in the automotive door having the side visor 5, the foreign object contacts at least both of the lowermost edge portion 5a of the side visor 5 and the top end portion 2a of the window glass 2 (FIG. 32).

Therefore, according to the present embodiment, the cord switch 4 detects the pinching of the foreign object by sensing the external force F acting on the side visor 5, and therefore it is possible to prevent the trouble that if the foreign object is pinched between the window glass 2 and the side visor 5, the upward and downward movement of the window glass 2 will not stop.

A reaction against the external force F acting on the side visor 5 is generated not only at the intersection between the line of action of the external force acting on the side visor 5 and the window frame 3 but in the vicinity of the intersection. The cord switch 4 is located in the joining part IV between the window frame 3 and the side visor 5. Therefore, if the external force F acts on a specific part of the side visor 5 for instance, there will never occur such a trouble that the external force F acts only on a specific part of the cord switch 4 corresponding thereto.

Accordingly, if the conducting members 42 to 44 are located in the dead zones which will not be deflected and the current will also not flow when the specific part of the cord switch 4 receives the external force F like the immediately upper part of the insulating members 47 and 48, the conducting members 42 to 44 in the vicinity of the insulating members 47, 48 will be deflected with a reaction from the window frame 3, becoming ready for energizing. Therefore, it is possible to reliably sense the external force irrespective of the part of action of the external force on the side visor 5.

The foreign object, if pinched, contacts the edge portion 5a of the side visor 5 as described above. It is, therefore, possible to dispose the cord switch 4 on the edge portion 5a of the side visor 5. However, the edge portion 5a of the side visor 5 is located in a position where the edge portion 5a easily contacts a driver or a passenger, regardless of the pinching of a foreign object, when he gets on or off the automobile. Therefore in arranging the cord switch 4 on the edge portion 5a of the side visor 5, it is necessary to take due consideration of the abrasion resistance of the covered tube 41.

According to the present embodiment, because the cord switch 4 is mounted in the joining part IV between the window frame 3 and the side visor 5, the driver or passenger will not touch the covered tube 41 when getting on or off the automobile. Therefore no consideration of the abrasion resistance of the covered tube 41 is needed. This design not only improves durability of the cord switch 4 but improves durability of a power window apparatus having the anti-pinching mechanism.

Figure 6:
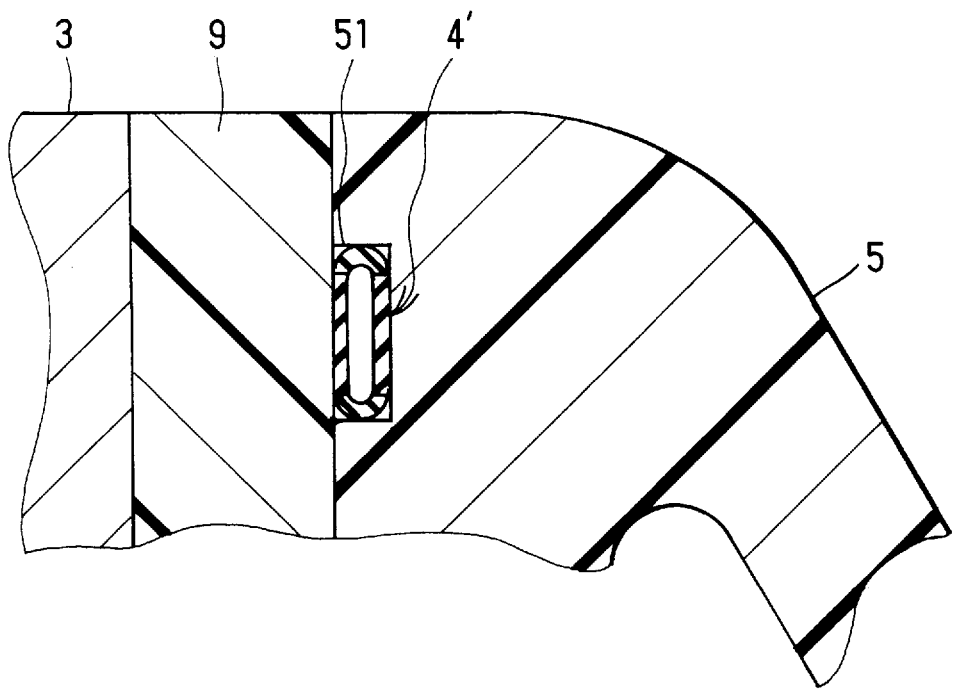
FIG. 6 is a sectional view showing a modification of the cord switch in the first embodiment.

It is to be noticed that the cord switch 4 used in the present embodiment is not limited to the above-described one and may be another type of cord switch 4' shown in FIG. 6.

The elastic member 9 interposed between the side visor 5 and the window frame 3 may be dispensed with.

Second Embodiment

Figure 7:
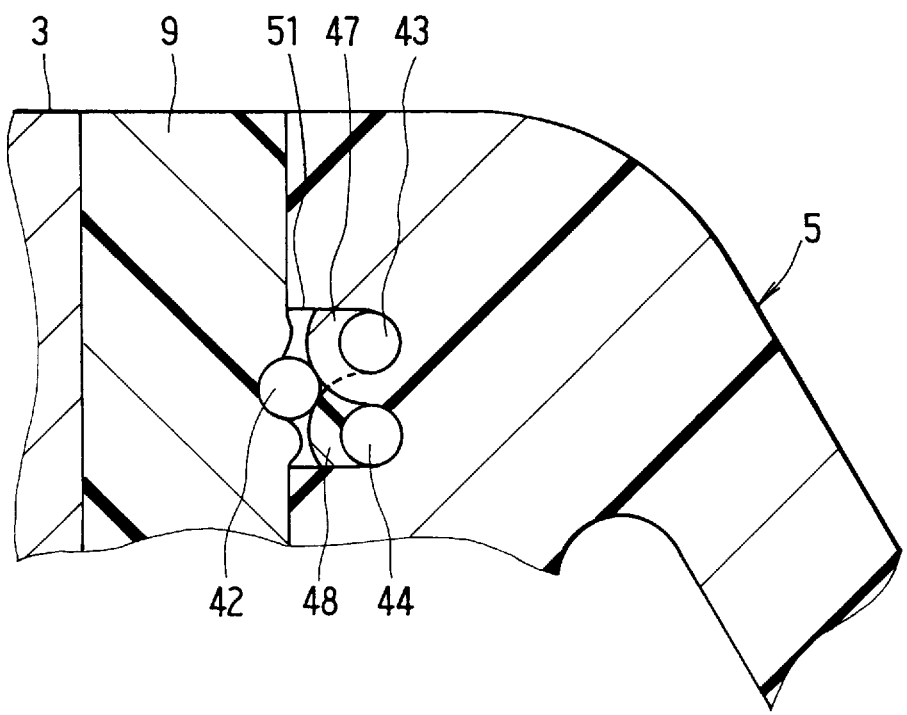
FIG. 7 is a sectional view of a cord switch used in a second embodiment of the present invention.

In the present embodiment, as shown in FIG. 7, the side visor 5 is a molding of an insulating resin. The insulating members 47 and 48 of the cord switch 4 is molded integrally with the side visor 5 so that the covered tube 41 in the first embodiment is not used. Thus it becomes possible to reduce the number of components, therefore enabling to decrease the manufacturing cost of the power window apparatus having the anti-pinching mechanism.

Third Embodiment

Figure 8:
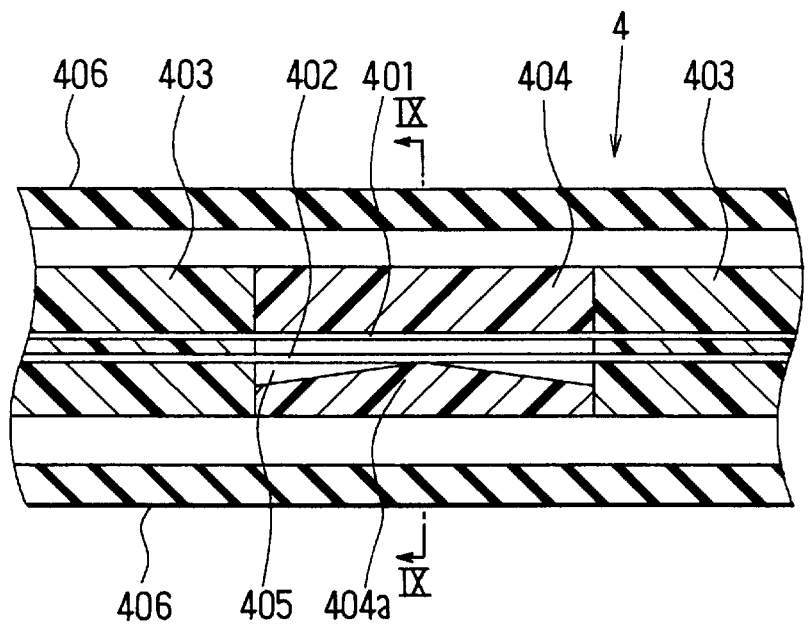
FIG. 8 is a sectional view of a cord switch used in a third embodiment of the present invention.
Figure 9:
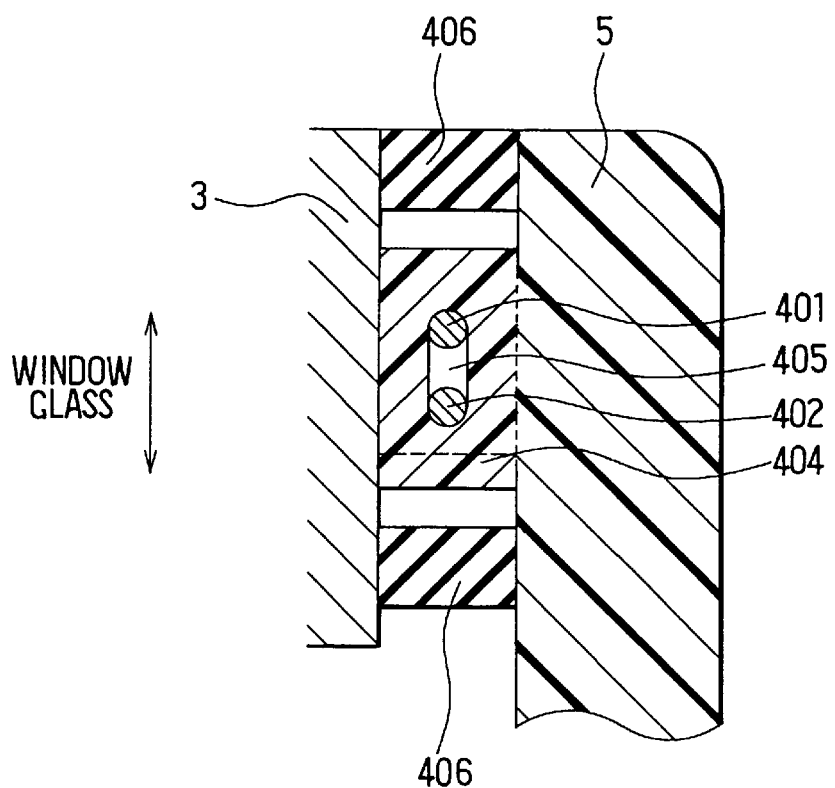
FIG. 9 is a sectional view taken along line IX—IX in FIG. 8.

In FIGS. 8 and 9, reference numerals 401 and 402 denote first and second conducting members extended along the window frame 3 and disposed face to face across a predetermined space. These conducting members 401 and 402 are held by a holding member 403 of resin joined to the window frame 3.

In the present embodiment the conducting members 401 and 402 are displaceable or slidable in the longitudinal direction of the conducting members 401 and 402 with respect to the holding member 403, have a circular cross section, and are made of stainless steel or phosphor bronze.

Reference numeral 404 designates a displaceable member made of resin which can be displaced with respect to the conducting members 401 and 402. This displaceable member 404 is provided with a through hole 405 through which the conducting members 401 and 402 are inserted. The holding member 403 and the displaceable member 404 are arranged alternately along the contour of the window frame 3.

A triangular projection 404a protruding toward closing the window glass 2 is formed on the side of second conducting member 402 of the through hole 405, while a smooth flat surface is formed on the side of first conducting member 401.

The holding member 403 is connected to the window frame 3 and the displacement member 404 is connected to the joining part IV of the side visor 5. The side visor 5, therefore, is secured on the window frame 3 through the displacement member 404, conducting members 401, 402, and the holding member 403.

The sectional form of the through hole 405 is oblong as shown in FIG. 9 so that the direction of long diameter will agree with the direction of operation, i.e., the direction of movement of the window glass 2, and that the short diameter of the through hole 405 will nearly coincides with the diameter of the through hole 405. The oblong configuration of the through hole 405, two conducting members 401, and the window frame 3 constitute the displacement restricting member for restricting displacement of the displacement member 404 in a direction in which the displacement member 404 intersects the direction of movement of the window glass 2.

Reference numeral 406 denotes a sealing member made of an elastic material, such as rubber, for preventing entrance of foreign substances, for example rain water, into the cord switch 4.

Figure 10:
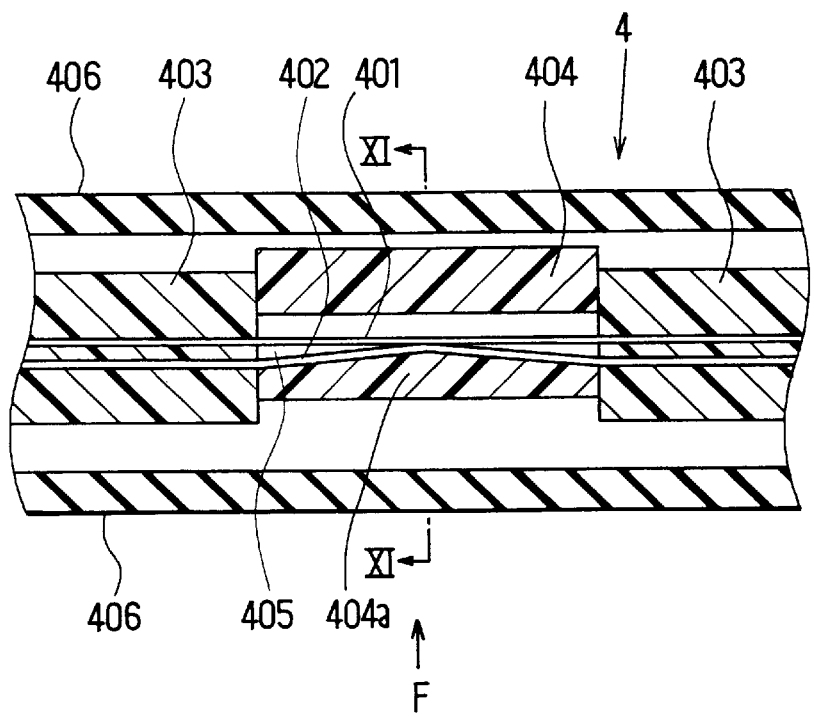
FIG. 10 is a sectional view of the cord switch used in the third embodiment.
Figure 11:
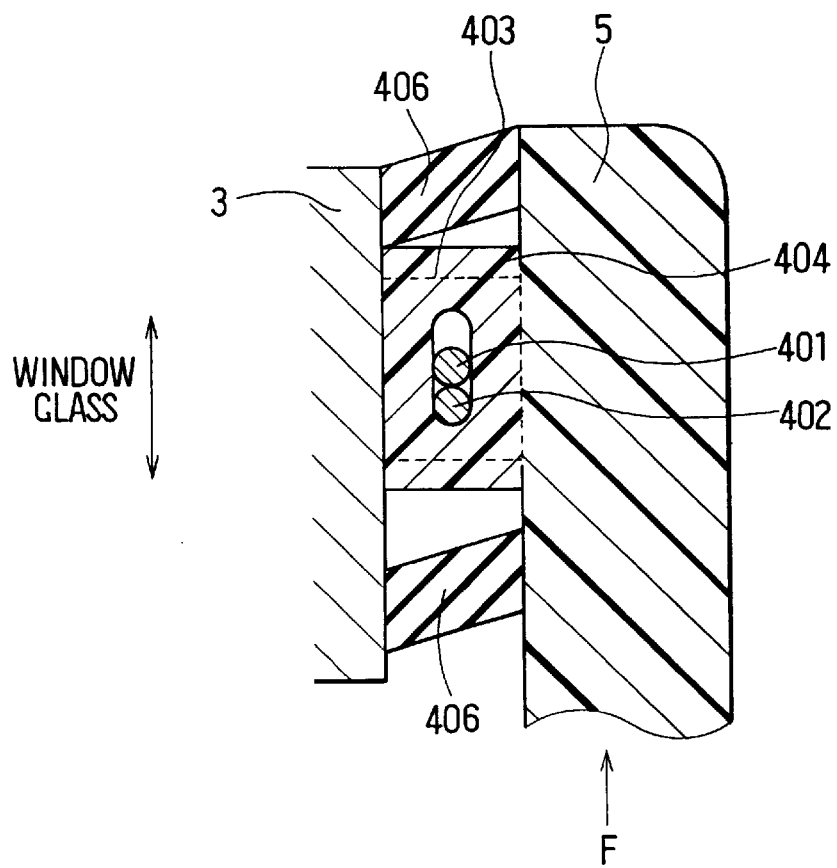
FIG. 11 is a sectional view taken along line XI—XI in FIG. 10.

If the external force F acts on the side visor 5, the side visor 5 moves toward closing, in an upwardly direction as shown in FIGS. 10 and 11, thus moving the displacement member 404 upwardly. At this time, the external force F concentratedly acts on the conducting member 402 through the projection 404a, to deflect the second conducting member 402 into contact with the first conducting member 401, thereby detecting the external force F.

According to the cord switch 400 of the present embodiment, the displacement of the displacement member 404 in the direction intersecting the direction of window glass operation is restricted by the oblong hole configuration of the through hole 405. Therefore there will not occur such an error as detecting an external force of wind for example exerted in a direction intersecting the direction of operation of the window glass 2. Only the external force F resulting from the pinching of a foreign object can be detected.

Since both the conducting members 401 and 402 are movable in the longitudinal direction of both the conducting members 401 and 402 in relation to the holding member 403, a difference in the curvature radius of both the conducting members 401 and 402 can be absorbed if the cord switch 4 is located in the bent section 3d (FIG. 2) of the window frame 3. Therefore, it is possible to prevent the trouble that both the conducting members 401 and 402 contact notwithstanding the external force F is not exerted to the bent section 3d.

The control device 6 generates a signal 6a at time t1 when the external force F (F1 in FIG. 12) is detected with the contact of both the conducting members 401 and 402, the window glass 2 will stop or reverse at time t2 with a time lag caused by the moment of inertia of the driving motor 1 and the inertia force of the window glass 2 after the detection of the external force F. This phenomenon is called the time lag.

Therefore, when the external force F is detected and then the signal 6a is generated, the pinching of a foreign object will proceed until the window glass 2 stops or reverses.

Figure 12:
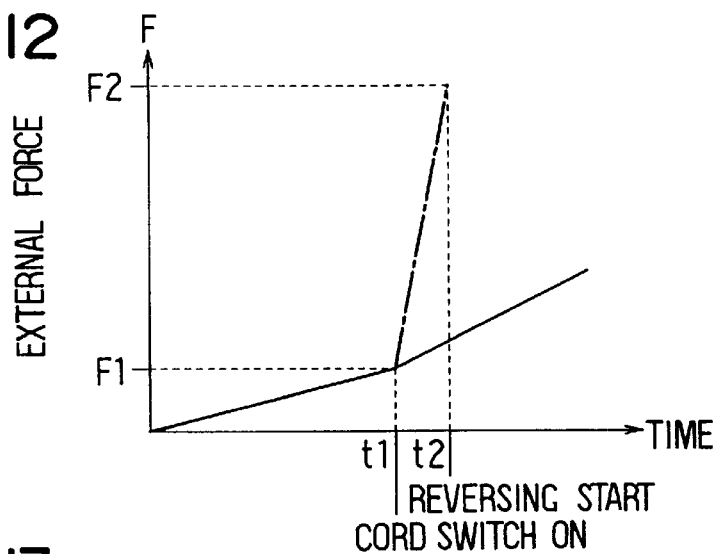
FIG. 12 is a graph showing a relationship between an external force and time.

Here, in the cord switch 4' shown in FIG. 6 for example, the rigidity of the cord switch 4' increases after both the conducting members contact, resulting in a sudden increase in the external force F produced as indicated by a dot-and-chain line in FIG. 12.

On the contrary, according to the cord switch 4 of the present embodiment, both the conducting members 401 and 402 can be displaced or deformed even after the contact of the conducting member 402 with the first conducting member 401, and therefore it becomes possible to prevent the external force F from excessively increasing during the period of time lag so that it may change as indicated by a full line in FIG. 12.

In the present embodiment, the holding member 403 is connected to the window frame 3 and the displacement member 404 is connected to the joining part IV of the side visor 5. It should be noted that the holding member 403 may be connected to the joining part IV of the side visor 5 and the displacement member 404, to the window frame 3.

Fourth Embodiment

Figure 13:
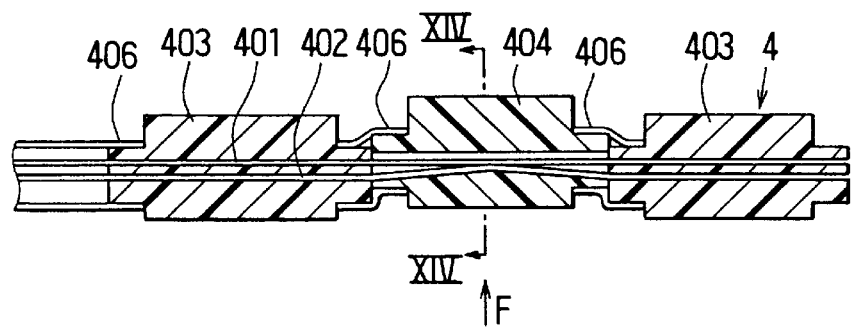
FIG. 13 is a sectional view of a cord switch used in a fourth embodiment of the present invention.
Figure 14:
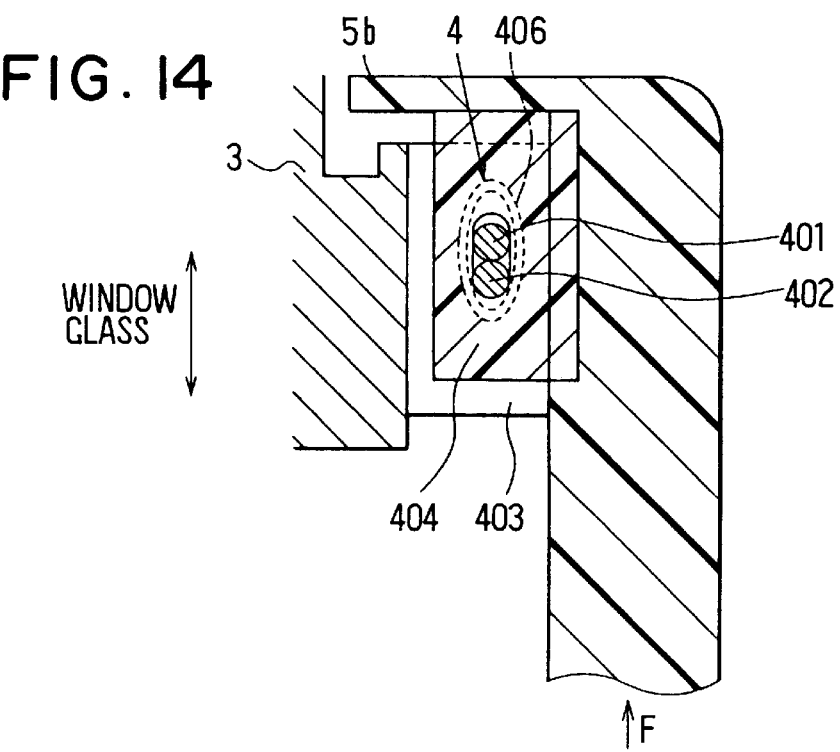
FIG. 14 is a sectional view taken along line XIV—XIV in FIG. 13.

Although in the foregoing third embodiment the cord switch 4 including both the conducting members 401 and 402, the holding member 403, and the displacement member 404 is disposed in such a manner that its entire part is covered with the sealing member 406, as shown in FIGS. 13 and 14 the sealing member 406 is provided only in the part of contact between the holding member 403 and the displacement member 404. FIGS. 13 and 14 indicate the cord switch 4 on which the external force F is acting.

In the present embodiment, on the upper side of the side visor 5, a cover section 5b is formed integrally with the side visor 5 to prevent the entry of rain water directly into the cord switch 4.

Fifth Embodiment

Figure 15:
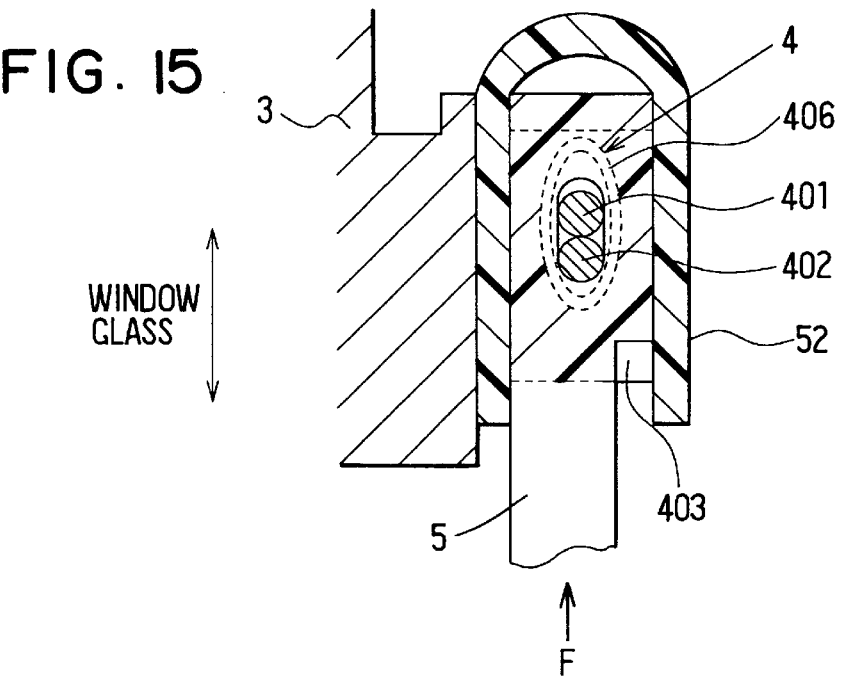
FIG. 15 is a sectional view showing a side visor attached with a cover member.
Figure 16A:
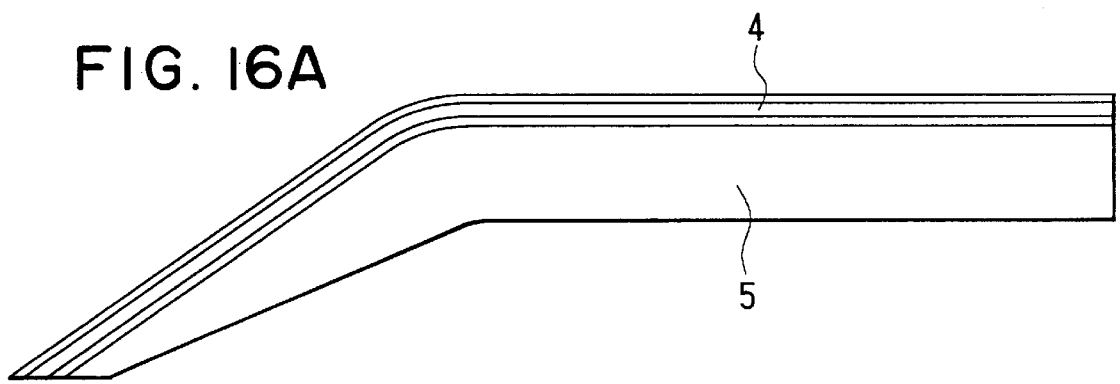
FIG. 16A is a front view showing the side visor provided with the cord switch.
Figure 16B:
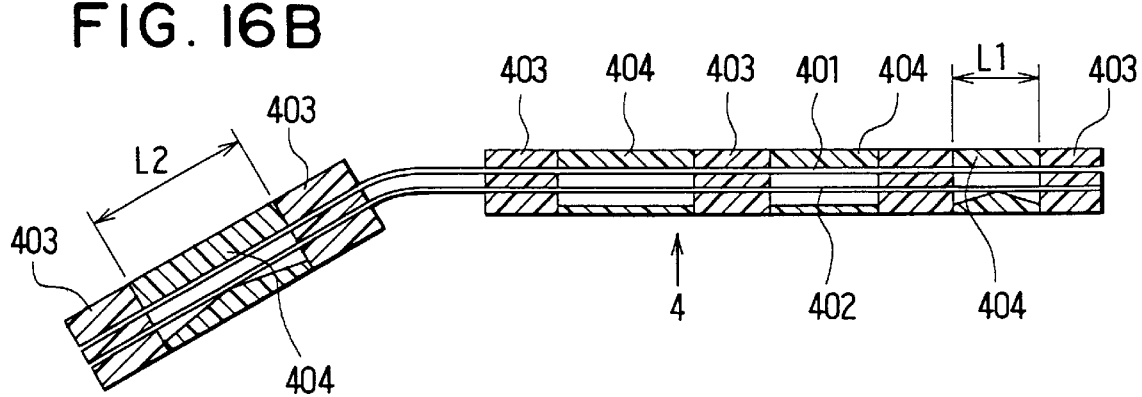
FIG. 16B is an enlarged sectional view of the cord switch mounted in the side visor.

Although in the fourth embodiment the cover section 5b is formed integral with the side visor 5, in the present embodiment shown in FIG. 15 and FIGS. 16A and 16B, the side visor 5 is slidably held in the up-and-down direction, i.e., in the direction in which the window glass 2 is opened and closed, and at the same time a cover member 52 is provided separately from the side visor 5, having a U-bent section and covering as if holding the joining part of the side visor 5 from above. The inner wall of the cover member 52 serves also as a displacement restricting member or guide wall which allows the side visor 5 to slide only in the up-and-down direction.

In the present embodiment, the cord switch 4 is mounted in the cover member 52 and the holding member 403 is connected to the inner wall of the cover member 52. The projection is not needed to be mounted in all the displacement member 404, and may be dispensed with in the region of the window frame 3 where the external force F caused by the pinching of a foreign object increases.

When the projection is not provided, the external force F is uniformly distributed to the second conducting member 402. Therefore the external force F necessary for contacting the conducting members 401 and 402 increases greater than that in the displacement member 404 provided with the projection.

Furthermore, the sizes L1 and L2 of the displacement member 404 may be changed in the region parallel with the longitudinal direction of both the conducting members 401 and 402 in accordance with the region of the window frame 3. In the present embodiment, the size L1 in the upper portion 3c is smaller than the size L2 in the front portion 3b.

Sixth Embodiment

Figure 17:
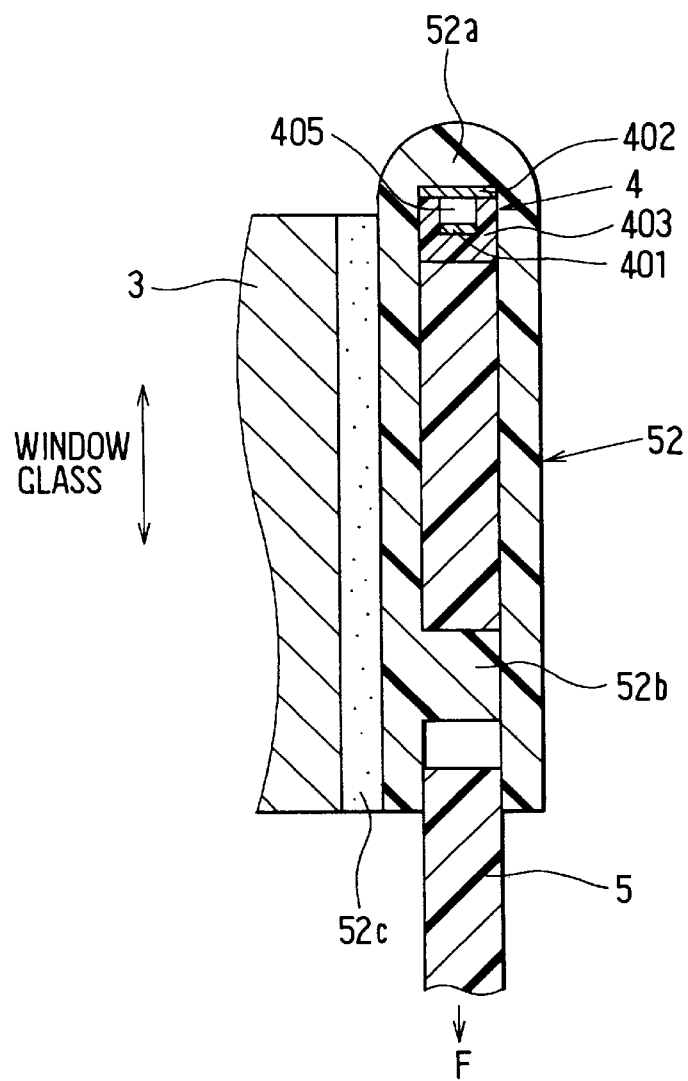
FIG. 17 is a sectional view of a side visor used in a sixth embodiment of the present invention.

In the present embodiment, a cord switch 4 is inserted in a bent section 52a of the cover member 52 as shown in FIG. 17. Reference numeral 52b denotes a stopper for restricting the maximum displacement of the side visor 5, and reference numeral 52c designates an adhesive tape for attaching the cover member 52 to the window frame 3.

Figure 18:
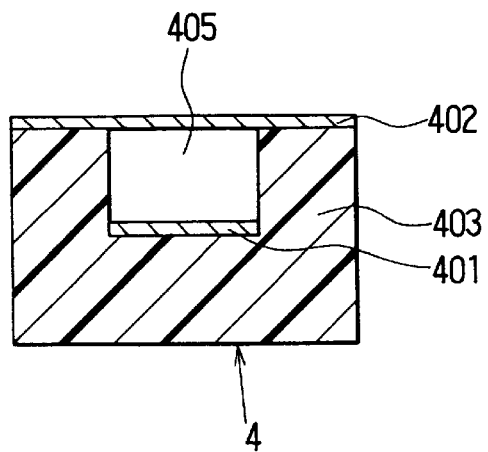
FIG. 18 is a sectional view of a cord switch used in the sixth embodiment.

The cord switch 4 of the present embodiment, as shown in FIG. 18, is comprised of an insulating holding member 403 of porous elastic material such as polyurethane or polyethylene which has a U-section intersecting at right angles the longitudinal direction, a first conducting member 401 thermally secured on the inner wall bottom of the insulating holding member 403, and a second conducting member 402 thermally secured to the opening of the insulating holding member 403.

Thermal securing mentioned above is a welding process including disposing heated conducting members 401 and 402 on the insulating holding member 403, for thermally attaching the conducting members 401 and 402 to the insulating holding member 403. The space 405 provided between both the conducting members 401 and 402 is formed by melting the insulating holding member 403 by the heat used in thermally securing the first conducting member 401.

Figure 19:
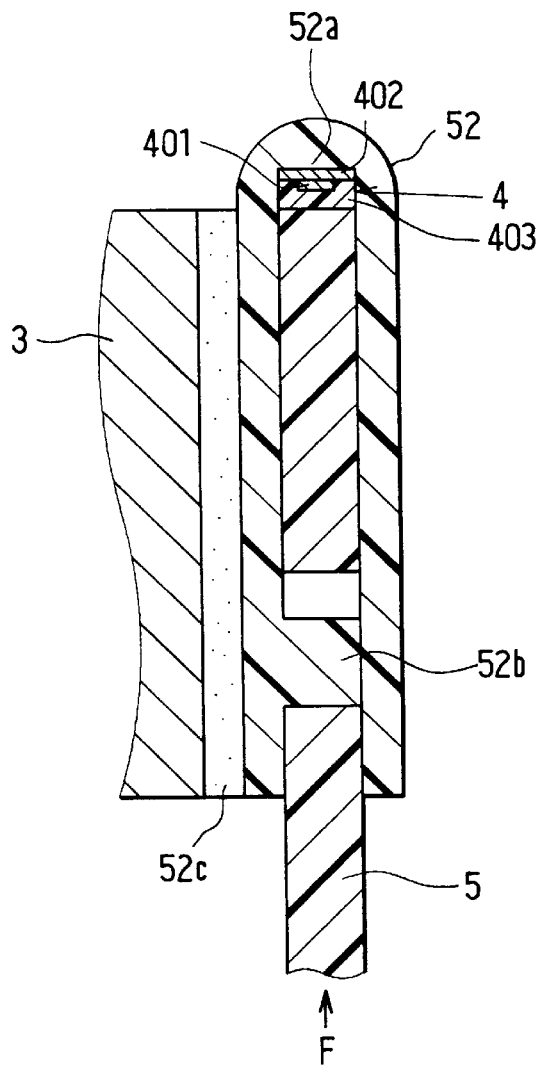
FIG. 19 is a sectional view of the side visor used in the sixth embodiment.

As shown in FIG. 19, the side visor 5 on which the external force F is acting upwardly with a foreign object pinched causes the conducting members 401 and 402 contact each other. When the external force F acts on the side visor 5, the side visor 5 displaces toward the bent section 52*a*, thus deforming the insulating holding member 403 into contact with the conducting members 401 and 402.

Figure 20:
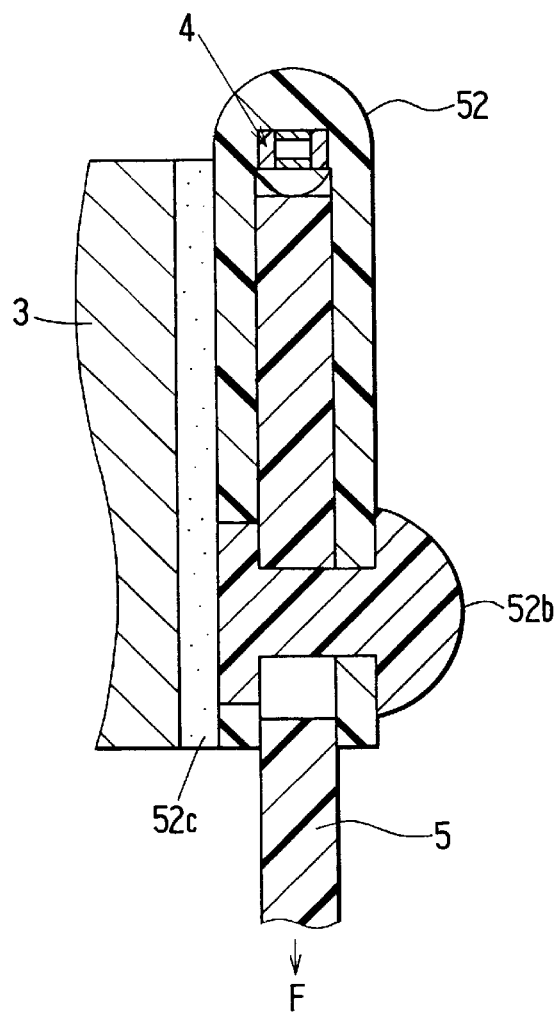
FIG. 20 is a sectional view showing a modification of the side visor used in the sixth embodiment.
Figure 21:
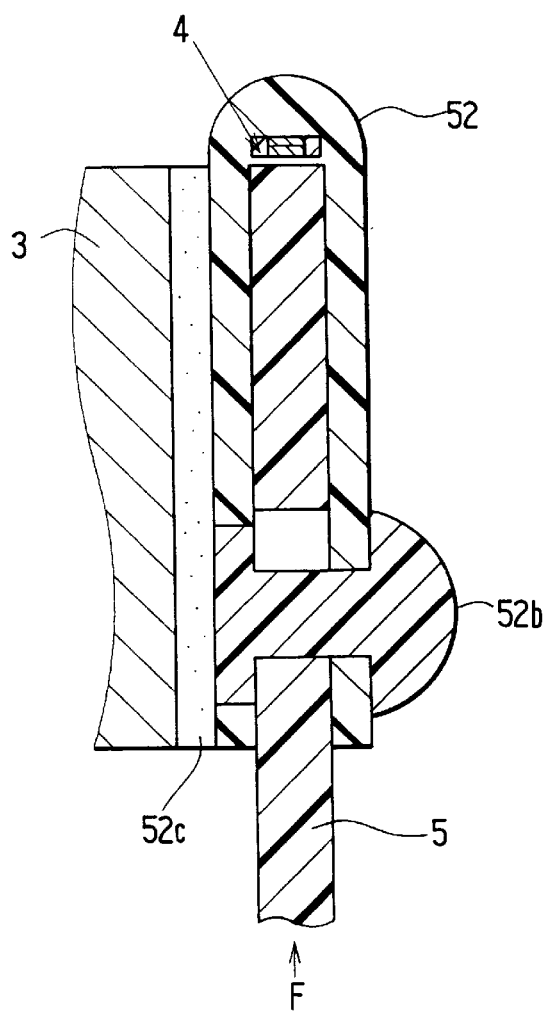
FIG. 21 is a sectional view showing another modification of the side visor used in the sixth embodiment.
Figure 22:
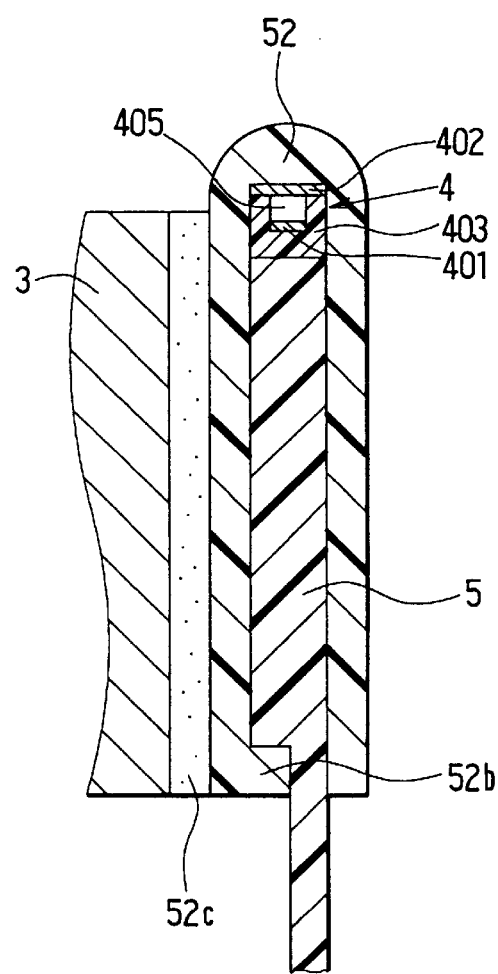
FIG. 22 is a sectional view showing a further modification of the side visor used in the sixth embodiment.

In the present embodiment, as shown in FIGS. 20 and 21 showing respectively the side visor 5 on which no external force F is acting and on which the external force F is acting, the insulating holding member 403 and the cover member 52 may be integrally formed. The stopper 52*b* may be formed on the side of the open end section of the cover member 52 as shown in FIG. 22.

Figure 23A:
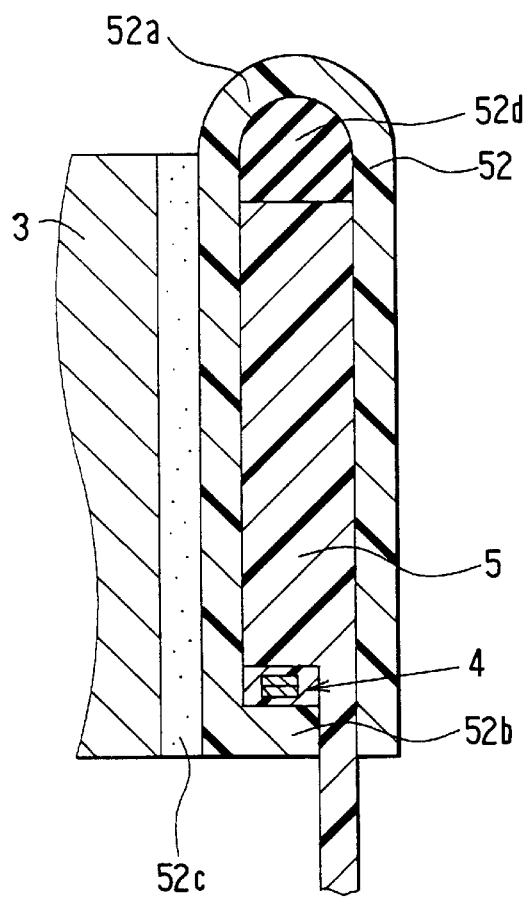
FIGS. 23A and 23B are sectional views sowing a still further modification of the side visor used in the sixth embodiment.
Figure 23B:
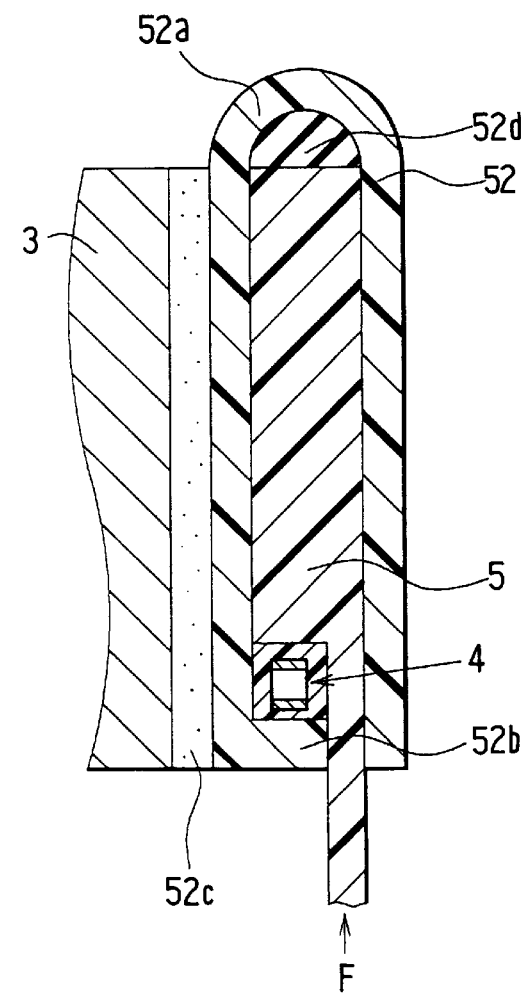

Also as shown in FIGS. 23A and 23B, an elastic member 52*d* such as rubber, spring, etc., which produces an elastic force for pressing normally the cord switch 4 so that the conducting members 401 and 402 contact each other when no external force is acting on the side visor 5. Therefore, as shown in FIG. 23A, when no external force is acting on the side visor 5, both the conducting members 401 and 402 is kept in contact. On the contrary, when the external force F is acting on the side visor 5, the cord switch 4 may be operated so that both the conducting members 401 and 402 in FIG. 23B will be separated thereby to detect pinching of a foreign object.

In FIGS. 19 to 23, an elastic member such as a plate spring may be used for bridging between the side visor 5 and the window frame 3, thereby enabling to prevent chattering of the side visor 5 caused by disturbance such as vehicle vibration. Thus it becomes possible to prevent the cord switch malfunction, i.e., improper signal generation for pinching of a foreign object despite no actual pinching of any foreign object.

Seventh Embodiment

Figure 24:
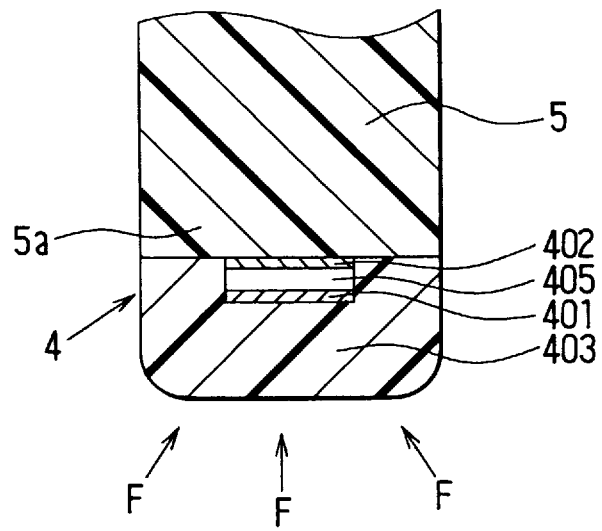
FIG. 24 is a sectional view showing the edge portion of a side visor used in a seventh embodiment of the present invention.

The present embodiment, as shown in FIG. 24, has the cord switch 4 disposed in the lowermost edge portion 5*a* of the side visor 5. It should be noted that the cord switch is not limited to the cord switch 4 described in the fifth and sixth embodiments and may be any type of cord switch described in the first to fourth embodiments.

Eighth Embodiment

Figure 25:
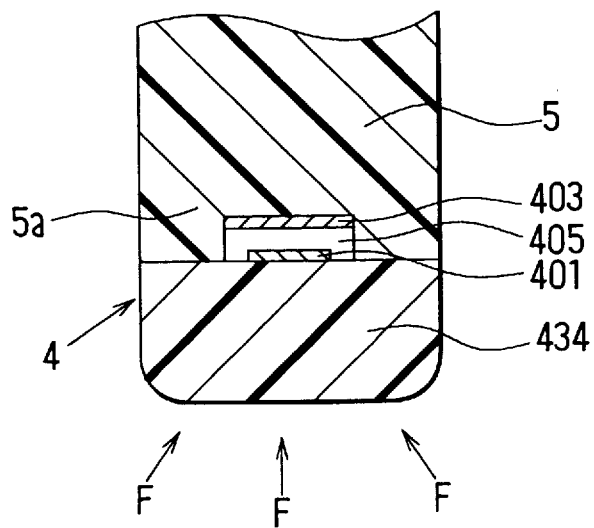
FIG. 25 is a sectional view showing the edge portion of a side visor used in an eighth embodiment of the present invention.

In the cord switch 4 shown in FIG. 25, a space 405 and both conducting members 401 and 402 are disposed in the edge portion 5*a* of the side visor 5 and a cover section 434 is provided for covering the edge side 5*a* which will come into contact with a foreign object. The cover section 434 is made of a porous elastic material such as polyurethane, polyethylene, etc.

Ninth Embodiment

Figure 26A:
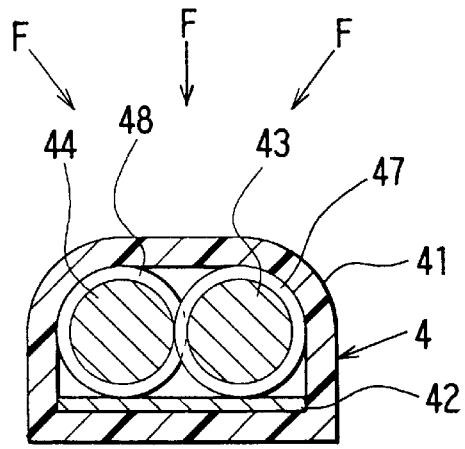
FIGS. 26A and 26B are explanatory views of a cord switch used in a ninth embodiment of the present invention.
Figure 26B:
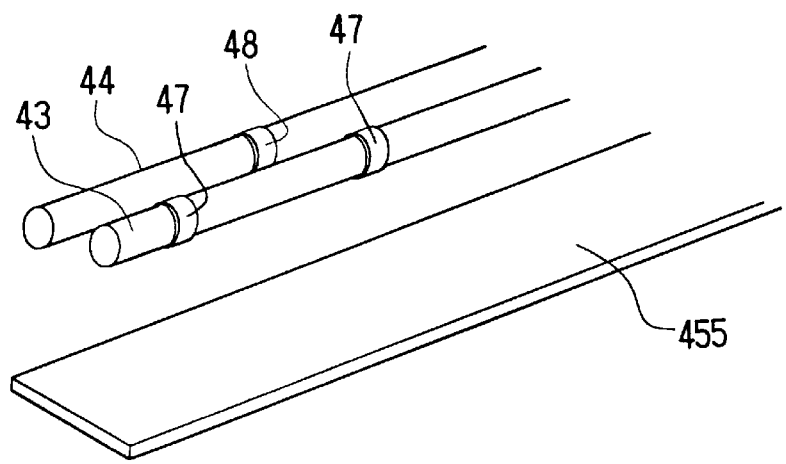

The cord switch 4, as shown in FIGS. 26A and 26B, uses a flat conducting member as the first conducting member 42. The cord switch 4 of the present embodiment is disposed in the edge portion 5*a* of the window frame 3 or the side visor 5. It is desirable that the second and third conducting members 43 and 44 be disposed facing the side on which the external force F acts, in the direction in which the window glass 2 is opened.

When the conducting members 42 to 44 are arranged in a triangular form as in the first embodiment, the first conducting member 42 will not deflect within the covered tube 41 but will move in between the second and third conducting members 43 and 44 if the covered tube 41 has a low rigidity when the external force F acts from a direction perpendicular to the linear direction connecting for example the centers 02, 03 of the second and third conducting members 43 and 44 to the first conducting member 42. Therefore, if the external force F acts, the first conducting member 42 and the second and third conducting members 43 and 44 will not contact each other, and therefore the external force F can not be sensed.

According to the present embodiment, the first conducting member 42 is formed flat, and therefore the first conducting member 42 will not move in between the second and third conducting members 43 and 44. Consequently the external force F can be sensed exactly.

Tenth Embodiment

Figure 27:
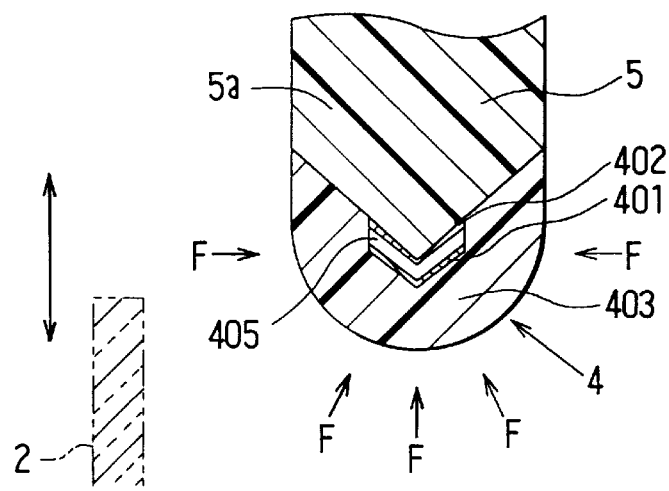
FIG. 27 is a sectional view showing the edge portion of a side visor used in a tenth embodiment of the present invention.

As shown in FIG. 27, the cord switch 4 of the present embodiment is disposed in the edge portion 5*a* of the side visor 5. Both conducting members 401 and 402 are bent in V-shape cross section projecting in the direction in which the window glass 2 is opened, for the purpose of providing a wide sensing range. Both the conducting members 401 and 402 are held by an insulating holding member 403 made of a porous elastic member such as polyurethane, polyethylene, etc. The insulating holding member 403 serves also as a protective cover covering both the conducting members 401 and 402.

Eleventh Embodiment

The present embodiment has a purpose of reducing a malfunction of not only the cord switch 4 but the entire mechanism of the power window apparatus having the anti-pinching mechanism.

Figure 28:
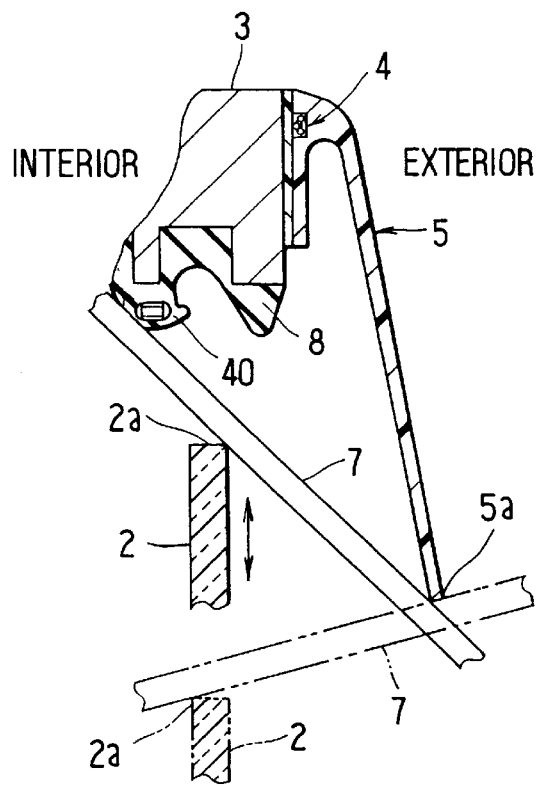
FIG. 28 is a sectional view showing an eleventh embodiment of the present invention.

That is, in addition to the cord switch, or first cord switch 4 for sensing the external force acting on the side visor 5 described in the above-described embodiments, another cord switch or a second cord switch 40 is disposed in the weatherstrip 8 as shown in FIG. 28 and also a load detecting circuit is provided for detecting the driving load of the driving motor 1.

Figure 29:
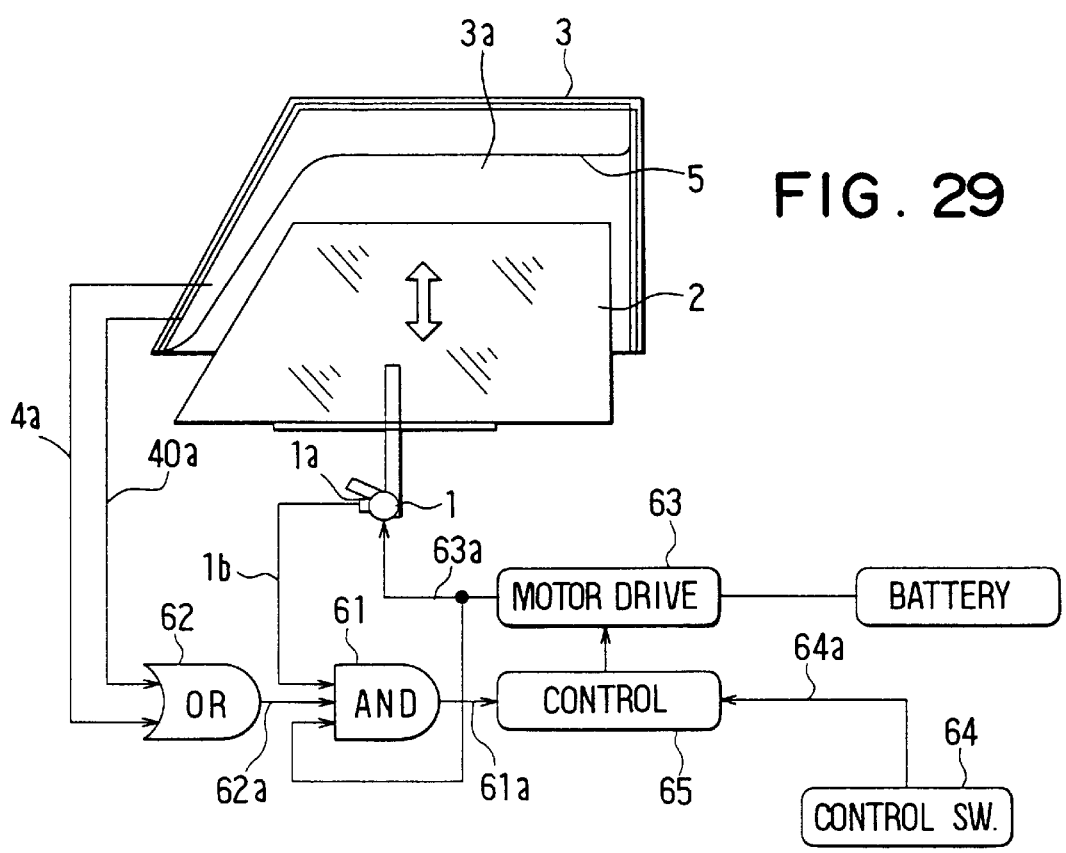
FIG. 29 is an electric wiring diagram of a power window apparatus according to the eleventh embodiment.

The load detecting circuit, comparing a detected value of a speed sensor 1*a* provided on the driving motor 1 as shown in FIG. 29, determines that the driving load exceeds a specific value and outputs an overload signal 1*b* to an AND gate 61 in the event the detected window moving speed output of the speed sensor 1*a* decreases below the specific value. Furthermore, both a first signal 4*a* generated when the first cord switch 4 senses an external force exceeding the specific value and a second signal 40*a* generated when the second cord switch 40 senses an external force exceeding a specific value are inputted to an OR gate 62. Together with a pinching detection signal 62*a* from the OR gate 62, a window closing signal 63*a* is inputted to an AND gate 61 from a motor driving circuit 63 for driving the driving motor 1. The window closing signal 63*a* is produced when the driving motor 1 is turning in a direction in which the window glass 2 is closed.

A control signal 64*a* from a control switch 64 which is operated by a passenger to open and close the window glass 2, and a stop signal 61*a* outputted from the AND gate 61, are inputted into a control circuit 65. Usually the control circuit 65 operates the motor driving circuit 63 in accordance with the control signal 64*a*. When the stop signal 61*a* is outputted from the AND gate 61, the control circuit 65 reverses or stop the driving motor 1.

That is, the power window apparatus of the present embodiment functions to reverse or stop the window glass by detecting the pinching of a foreign object in the event that an external force sensed by at least one of the first cord switch 4 and the second cord switch 40 exceeds a specific value and that the driving load of the driving motor 1 exceeds a specific value during window glass moving operation.

In the present embodiment, the second cord switch 40 and the OR gate 62 are provided. However, it should be noticed that both of them may be eliminated, and the first signal 4*a* may be inputted from the first cord switch 4 directly to the AND gate 61. Also the second cord switch 40 may be disposed on the outside of the weatherstrip 8 to sense the external force acting on the window frame 3.

Furthermore, in the present embodiment, the driving load is detected by detecting the rotational speed of the driving motor 1, but may be detected by detecting the value of the electric current flowing into the driving motor 1.

Twelfth Embodiment

Figure 30A:
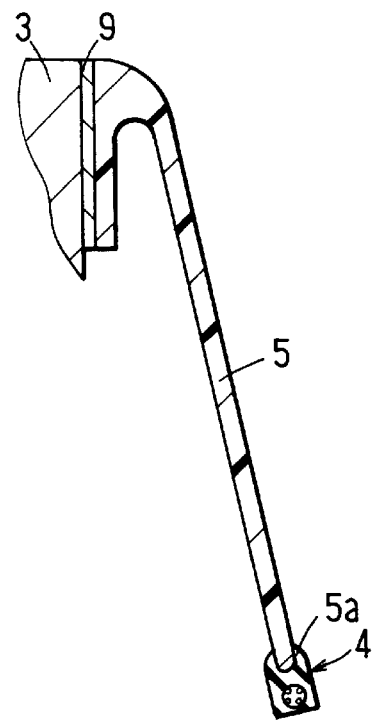
FIGS. 30A and 30B are a sectional view and an enlarged view showing a cord switch and a side visor used in a twelfth embodiment of the present invention.
Figure 30B:
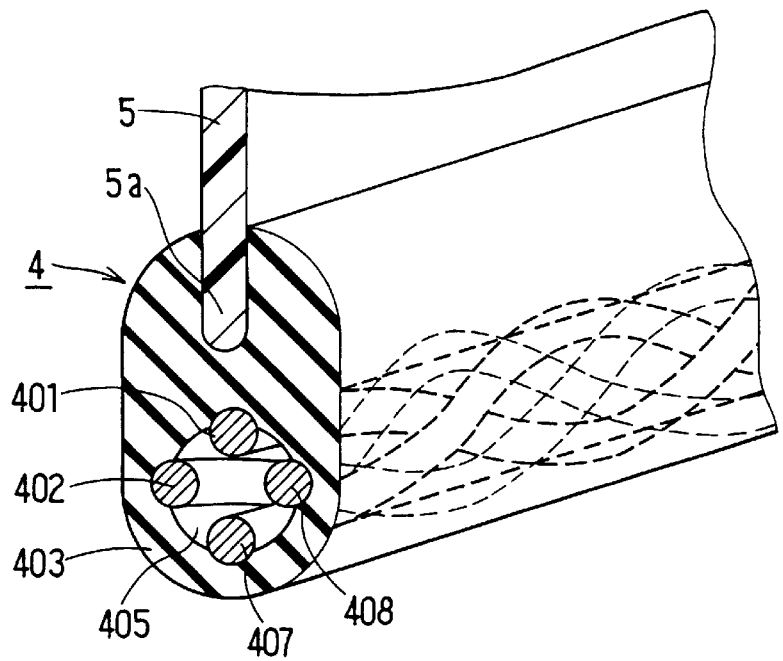

In the present embodiment, as shown in FIGS. 30A and 30B, the cord swit 4 is attached to the edge portion 5*a* of the side visor 5. The cord switch 4 has at least three conducting members (four in the present embodiment) 401, 402, 407 and 408 which are disposed in the elastically deformable insulating member 403 such as rubber to face one another with insulating space 405 thereamong.

Each of the conducting members is partly embedded in the inner wall of the insulating member 403 under the condition that those are disposed spirally in the insulating member 403. Voltages are applied to the conducting members 401, 402, 407 and 408 so that one conducting member (member 401, for instance) is kept at a potential different from that of the remaining conducting members (members 402, 407 and 408, for instance). Thus, an external force F acting on the side visor 5 can be detected when the insulating member 403 deforms and the conducting members of different potentials contact.

In the cord switch 4 according to the present embodiment, other voltages may also be applied so that the conducting members 401, 402, 407 and 408 are kept at different potentials to detect the external force F.

Figure 31:
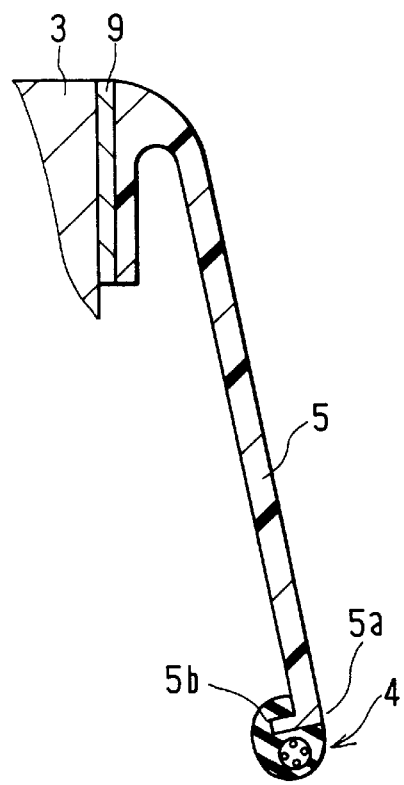
FIG. 31 is a sectional view showing a modification of the cord switch and the side visor used in the twelfth embodiment.

Further, as shown in FIG. 31, the edge portion 5*a* of the side visor 5 may be bent toward the vehicle interior and the cord switch 4 may be disposed at the bent portion 5*b*.

The foregoing embodiments may be modified further in many other ways without departing from the spirit and scope of the invention.

What is claimed is:

1. A power window apparatus for a vehicle, comprising:
   a window body for opening and closing a window opening formed by a window frame;
   a side visor molded in a substantial plate, said side visor provided along an exterior periphery of said window frame and disposed on an exterior surface of said window frame, opposite to an interior of said vehicle, for providing shade to the periphery of said window opening;
   a sensing switch disposed on an exterior side of said window frame, opposite to said interior of said vehicle, for sensing an external force acting on said side visor; and
   window closing operation stopping member for stopping a closing motion of said window body when the external force sensed by said sensing switch exceeds a preset value.

2. A power window apparatus as claimed in claim 1, wherein:
   said sensing switch is located in a joining part where said side visor is attached to said window frame.

3. A power window apparatus as claimed in claim 2, further comprising:
   a cover member joined to said window frame for holding said side visor slidably in an up-and-down direction and covering said joining part from above;
   said sensing switch being located within said cover member.

4. A power window apparatus as claimed in claim 2, wherein said sensing switch includes:
   a pair of conducting members extended along said window frame and disposed face to face at a predetermined spacing therebetween;
   a holding member for holding said pair of conducting members; and
   a displacement member positioned displaceably with respect to said holding member and to said pair of conducting members,
   wherein said holding member is connected to one of said window frame and said side visor, and said displacement member is connected to the other of said window frame and said side visor.

5. A power window apparatus switching device as claimed in claim 4, wherein:
   said pair of conducting members are disposed face to face in a direction in which said window body is opened and closed; and
   said displacement member being provided with displacement restricting member for restricting the displacement of said displacement member in a direction intersecting the direction in which said window body is open and closed.

6. A power window apparatus as claimed in claim 1, wherein:
   said sensing switch has a pair of conducting members extended along said window frame and disposed face to face across a predetermined space therebetween; and
   an insulating holding member made of a porous elastic material for holding said pair of conducting members to thereby define said space therebetween.

7. A power window apparatus as claimed in claim 6, wherein:
   said insulating holding member is made of at least one of the materials such as polyurethane and polyethylene.

8. A power window apparatus, comprising:
   a window body for opening and closing a window opening formed in a window frame;
   a side visor provided along an exterior periphery of said window frame, for providing shade to a periphery of said window opening;
   a sensing switch for sensing an external force acting on said side visor;
   a window body driving member for driving said window body;
   a load detecting member for detecting a driving load of said window body driving member; and
   window closing operation stopping member for stopping the movement of said window body toward closing when the external force sensed by said sensing switch exceeds a preset value and also when a detection value detected by said load detecting member exceeds a preset value.

9. A power window apparatus, comprising:

a window body for opening and closing said window opening formed in said window frame;

a side visor provided along an exterior periphery of said window frame for providing shade to a periphery of said window opening;

a first sensing switch for sensing an external force acting on said side visor;

a second sensing switch disposed on said window frame for sensing an external force acting on said window frame;

a window body driving member for driving said window body;

a load detecting member for detecting a driving load of said window body driving member; and window closing operation stopping means for stopping the movement of said window body toward closing when at least one of said first sensing switch and said second sensing switch exceeds a preset value and a detection value detected by said load detecting member exceeds a preset value.

10. A power window apparatus as claimed in claim 9, wherein:

said second sensing switch is disposed in a weatherstrip installed along a periphery of said window frame.

11. A side visor for a window frame, comprising:

a side visor body portion molded in a substantial plate to be attached to an exterior surface of said window frame, opposite to an interior of a vehicle, for shading a periphery of a window opening formed in said window frame; and a sensing switch embedded in said side visor body portion for sensing an external force acting on said side visor body portion, said sensing switch being located at said exterior surface of said window frame, opposite to said interior of said vehicle, when said visor body portion is attached to said window frame.

12. A side visor as claimed in claim 11, wherein:

said sensing switch is located in a joining part of said side visor body portion between said window frame and said side visor body portion.

13. A side visor as claimed in claim 11, wherein said sensing switch has:

a pair of conducting members extended along a part corresponding to said window frame and disposed face to face across a predetermined space therebetween; and an insulating holding member made of a porous elastic material for holding said pair of conducting members to form said space therebetween.

14. A side visor as claimed in claim 13, wherein:

said insulating holding member is made of at least one of the materials such as polyurethane and polyethylene.

15. A side visor as claimed in claim 11, wherein:

said sensing switch is located at an edge portion of said side visor body portion which is opposite to a joining part of said visor body portion between said window frame and said side visor body portion.

16. A side visor as claimed in claim 15, wherein said sensing switch has:

a plurality of conducting members extended spirally along a part corresponding to said window frame and disposed face to face across a predetermined space thereamong; and an insulating holding member attached to said edge portion and holding said conducting members therein.

* * * * *